US007106065B1

(12) United States Patent
Graf

(10) Patent No.: US 7,106,065 B1
(45) Date of Patent: Sep. 12, 2006

(54) METHOD OF GEOLOGIC EXPLORATION FOR SUBSURFACE DEPOSITS

(75) Inventor: Edwin X. Graf, Washington Island, WI (US)

(73) Assignee: Seismic Science, Inc., San Diego, CA (US)

( * ) Notice: Subject to any disclaimer, the term of this patent is extended or adjusted under 35 U.S.C. 154(b) by 0 days.

(21) Appl. No.: 11/264,642

(22) Filed: Nov. 1, 2005

(51) Int. Cl.
*G01V 3/08* (2006.01)
(52) U.S. Cl. ...................................... 324/337; 324/345
(58) Field of Classification Search ................ 324/337, 324/345
See application file for complete search history.

(56) References Cited

U.S. PATENT DOCUMENTS 7,002,350 B1 * 2/2006 Barringer ..................... 324/350

* cited by examiner

*Primary Examiner*—Bot LeDynh
(74) *Attorney, Agent, or Firm*—Taylor & Aust, P.C.

(57) ABSTRACT

A method of geologic exploration for subsurface deposits includes the steps of: emitting energy below a surface of the earth; sensing a plurality of reactive electro-magnetic waves resulting from the emitted energy; outputting signals from a plurality of sensors to a vehicle corresponding to the sensed reactive electro-magnetic waves; determining position data for the plurality of sensors; generating position marked data corresponding to the outputted signals and the position data; uploading the position marked data from the vehicle to a satellite; and relaying the position marked data from the satellite to a remote analyzing station.

22 Claims, 4 Drawing Sheets

METHOD OF GEOLOGIC EXPLORATION FOR SUBSURFACE DEPOSITS

BACKGROUND OF THE INVENTION

1. Field of the Invention

The present invention relates to geologic exploration, and, more particularly, to methods of gathering and analyzing data for such geologic exploration.

2. Description of the Related Art

Geologic exploration methods vary in type and success rate. For example, in the oil exploration technologies, 3D seismic surveys are commonly used prior to drilling a test well to increase the likelihood of finding an oil deposit below the surface of the earth. Nonetheless, the probability of a dry test hole is relatively high. The high cost of such test holes, particularly in deep sea environments, is an economic burden.

It is also known to use electromagnetic (EM) field methods, referred to as geo-electromagnetic methods, in hydrocarbon exploration such as oil exploration. With active EM logging, energy is transmitted below the surface of the earth and reactive EM waves are measured using appropriate electrical sensing and processing equipment. Smaller, more powerful and less expensive electronics have been a catalyst for developing this type of technology. However, the development of an accurate EM logging method for deep water, shallow water and land applications has proven difficult.

What is needed in the art is a method of oil exploration which has a higher probability of success, is less expensive than conventional exploration methods, and provides a higher level of data security.

SUMMARY OF THE INVENTION

The present invention provides a method of geologic exploration in which reactive electromagnetic waves are sensed, transmitted to a vehicle (such as a boat or truck), encrypted, uploaded to a satellite, and downloaded to a remote analyzing station.

The invention comprises, in one form thereof, a method of geologic exploration for subsurface deposits, including the steps of: emitting energy below a surface of the earth; sensing a plurality of reactive electromagnetic waves resulting from the emitted energy; outputting signals from a plurality of sensors to a vehicle corresponding to the sensed reactive electro-magnetic waves; determining position data for the plurality of sensors; generating position marked data corresponding to the outputted signals and the position data; uploading the position marked data from the vehicle to a satellite; and relaying the position marked data from the satellite to a remote analyzing station.

The invention comprises, in another form thereof, a method of geologic exploration for subsurface deposits, including the steps of: emitting energy below a surface of the earth; sensing a plurality of reactive electromagnetic waves resulting from the emitted energy using a plurality of sensors; outputting signals from the plurality of sensors to a vehicle corresponding to the sensed reactive electromagnetic waves; determining position data for the plurality of sensors; generating position marked data corresponding to the outputted signals and the position data; encrypting the position marked data; uploading the encrypted position marked data from the vehicle to a satellite; and downloading the encrypted position marked data from the satellite to a remote analyzing station.

An advantage of the present invention is that the data corresponding to subsurface deposits can be automatically uploaded to a remote analyzing station, without the operating personnel on the vehicle having useable access to the data.

Another advantage is that the geologic exploration method of the present invention can be used with either land or water based exploration systems.

Yet another advantage is that the position marked data can be transmitted to the vehicle either via a wireless or wired connection.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
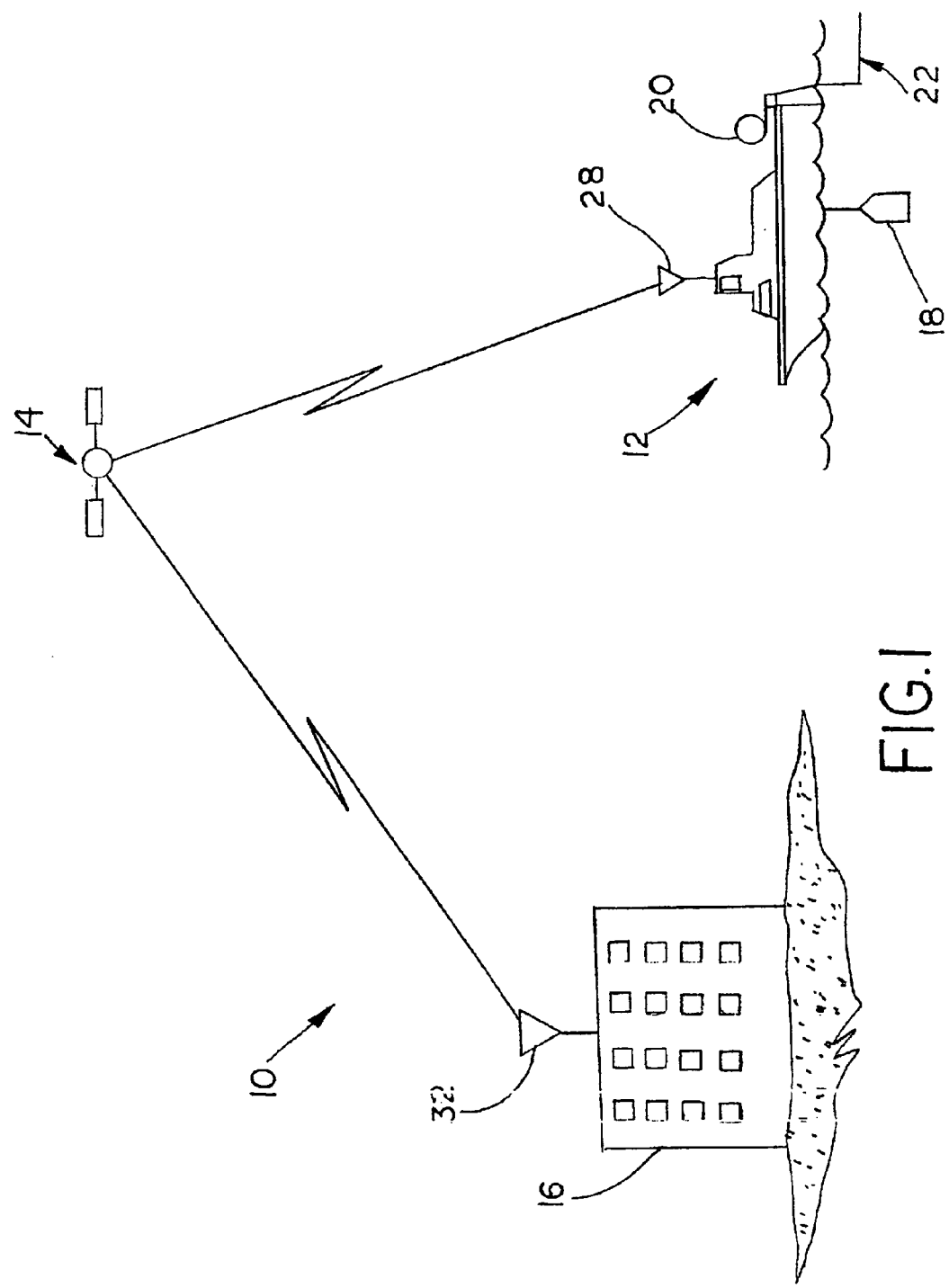
FIG. 1 is a schematic illustration of an embodiment of a sea based oil exploration system which may be used to carry out the method of oil exploration of the present invention.
Figure 2:
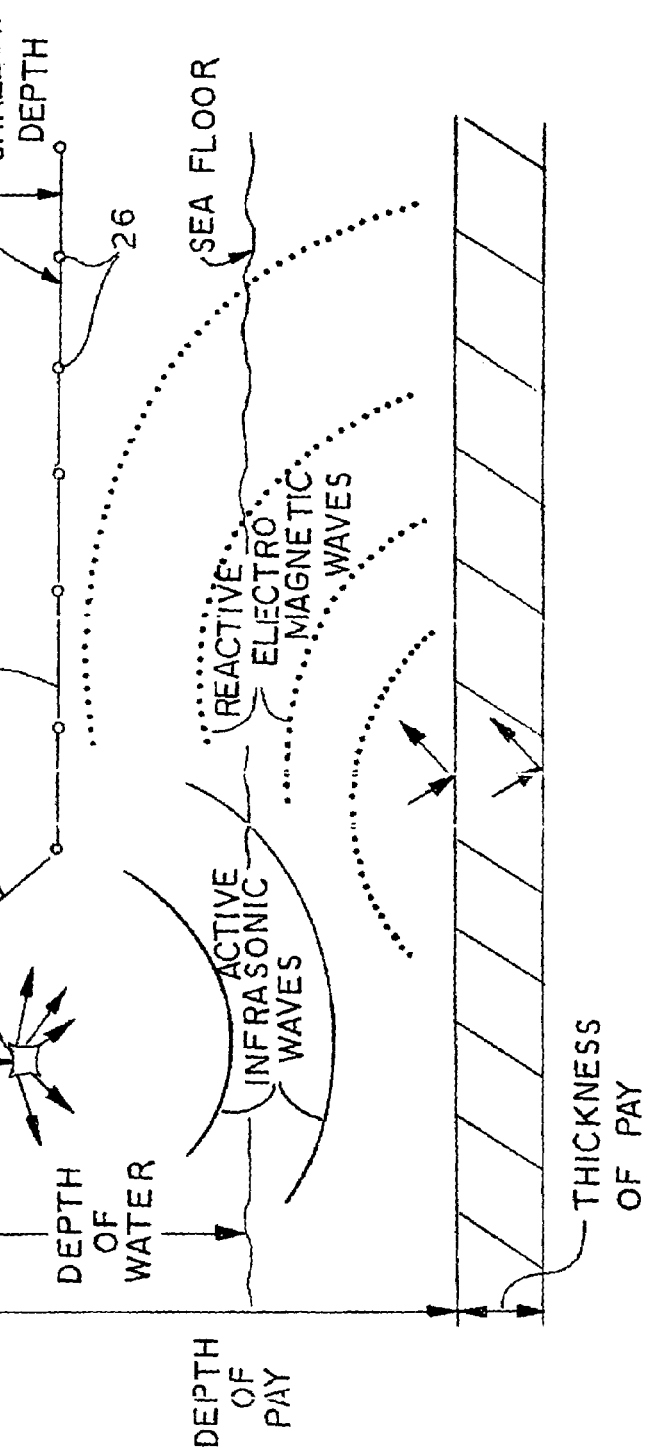
FIG. 2 is a graphical illustration of the sea based method of oil exploration of the present invention shown in FIG. 1.

Referring now to the drawings, and more particularly to FIGS. 1 and 2, there is shown an embodiment of a sea based oil exploration system 10 which may be used to carry out the method of oil exploration of the present invention. Oil exploration system 10 generally includes a vehicle in the form of a boat 12, a satellite 14 and a remote analyzing station 16.

Boat 12 is deployed at and moves across a surface of the earth, namely, water at a deep sea location. It is also possible that boat 12 may be deployed in a more shallow body of water, such as a shallow ocean location or a freshwater lake.

Boat 12 carries a deployable sparker 18 which may be selectively actuated to emit low frequency sound waves (less than 50 hertz) which are transmitted through the water and below the sea floor. Sparker 18 is powered by a direct current (DC) electrical power supply and is controllably actuated using an electronic controller (not shown).

Boat 12 also carries a reel 20, which in turn carries a deployable antenna 22. Antenna 22 basically is in the form of a streamer or cable 24 which carries a plurality of sensors 26 at approximately equidistant locations along the length thereof. Each sensor 26 is electrically coupled by suitable electric lines (not specifically shown but forming a part of cable 24) which are coupled with the electronic controller on board boat 12. Sensors 26 receive reactive electromagnetic waves which are generated as a result of active infrasonic waves at the interface between hydrocarbon pay (e.g., oil) and water. Sensors 26 output corresponding analog signals to the electronic controller. The number of sensors 26 carried by cable 24, as well as the distance between sensors 26 may vary, depending upon the particular application. In the embodiment shown, cable 24 is shown carrying six sensors 26 with a spacing of approximately 100 feet between each sensor along the length of cable 24.

Boat 12 also includes an antenna 28 which transmits encrypted signals to satellite 14. Antenna 28 is preferably configured as a transceiver for receiving and sending data to and from satellite 14. Satellite 14 receives the data from boat 12 via antenna 28, and transmits the data to remote analyzing station 16.

Remote analyzing station 16 includes an antenna 32 for receiving data from satellite 30, and provides the data to a computer system (not specifically shown) for detailed analysis. Remote analyzing station 16 is shown as a building in FIG. 1, but may also be configured as a truck, another boat, etc. Antenna 32 is preferably configured as a transceiver for two-way communication with boat 12 via satellite 14.

During use, sparker 18 emits a low frequency sound wave in the infrasonic range which travels through the water and impinges upon the sea floor. The infrasonic waves travel through the earth below the sea floor and impinge upon an area containing hydrocarbon pay. Reactive EM waves are generated at the interface of the hydrocarbon pay, and are transmitted back toward the surface of the water where they are sensed by sensors 26 approximately 0.5 to 3 seconds after generation of the sound pulse by sparker 18. Sensors 26 output signals to the electronic controller which define a water/hydrocarbon boundary. The data may be presented in SEGY format for integration with traditional seismic data. Since the reactive EM waves are only generated along an oil/water interface, the output signals generated by sensors 26 are a direct hydrocarbon indicator. The reactive EM waves resulting from the emitted low frequency sound waves define an induced electro-kinetic (IEK) effect which is measured and analyzed.

The position of boat 12 is determined as it moves through the water, and thus the position of the individual sensors 26 at predetermined locations along cable 24 may likewise be determined. For example, the GPS coordinates of boat 12 may be logged at predetermined time intervals while traveling through the water. Alternatively, the starting and ending positions of boat 12 may be determined, along with an average traveling speed to linearly interpolate a position of the boat along an assumed straight travel path between the starting and ending points. The positions of the various sensors 26 at a particular point in time is correlated with the corresponding sensed reactive EM waves at the same point in time to provide position marked data. The position marked data is uploaded from antenna 28 of boat 12 to satellite 14. Preferably, the position marked data is encrypted using a proprietary or commercially available encryption scheme. One such encryption and transmission scheme is known as "CAPSTONE" (TM) encryption marketed by CapRock Communications. Satellite 14 relays or downloads the encrypted, position marked data to antenna 32 at remote analyzing station 16. Remote analyzing station 16 may perform various functions using the encrypted, position marked data, such as data analysis of the position marked data to determine subsurface deposits of hydrocarbon; graphical illustrations of the position marked data; and/or invoicing, based upon the amount of survey exploration conducted.

With conventional geologic exploration methods, the data analysis may occur onboard boat 12, and in fact the data itself may be observed and analyzed by the personnel onboard boat 12. In contrast, the data corresponding to the output signals from sensors 26 are immediately encrypted and transmitted via satellite to remote analyzing station 16. In this manner, the crew and other personal onboard boat 12 are not given access to the data which might indicate the existence of hydrocarbon pay as boat 12 travels through the water. This may be advantageous in certain instances.

The method of geologic exploration of the present invention as described above is not only useful for determination of hydrocarbon pay such as oil or gas below the surface of the earth, but is also useful for determining the presence of other subsurface deposits, such as metals and/or minerals.

Figure 3:
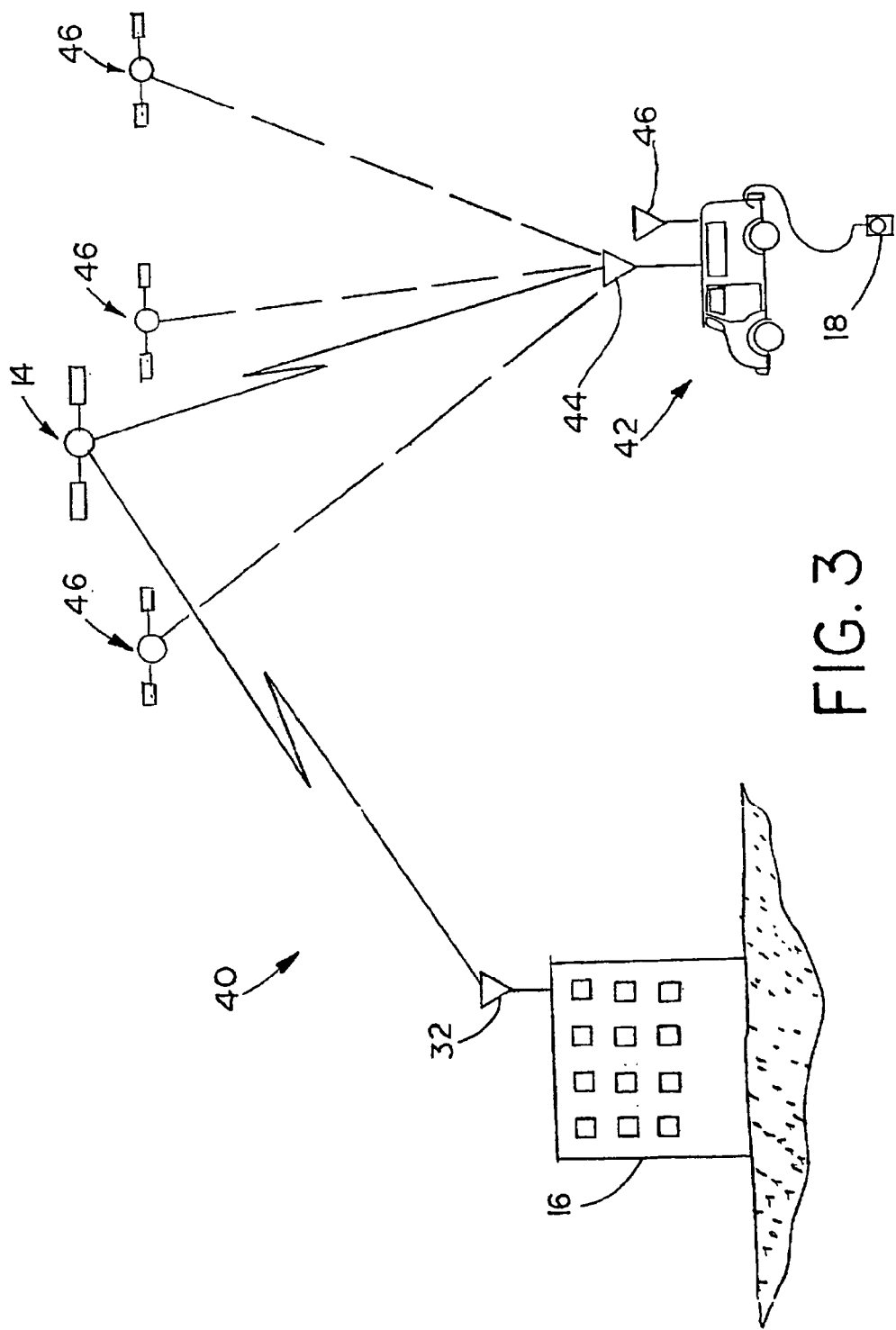
FIG. 3 is a schematic illustration of an embodiment of a land based oil exploration system which may be used to carry out the method of oil exploration of the present invention.
Figure 4:
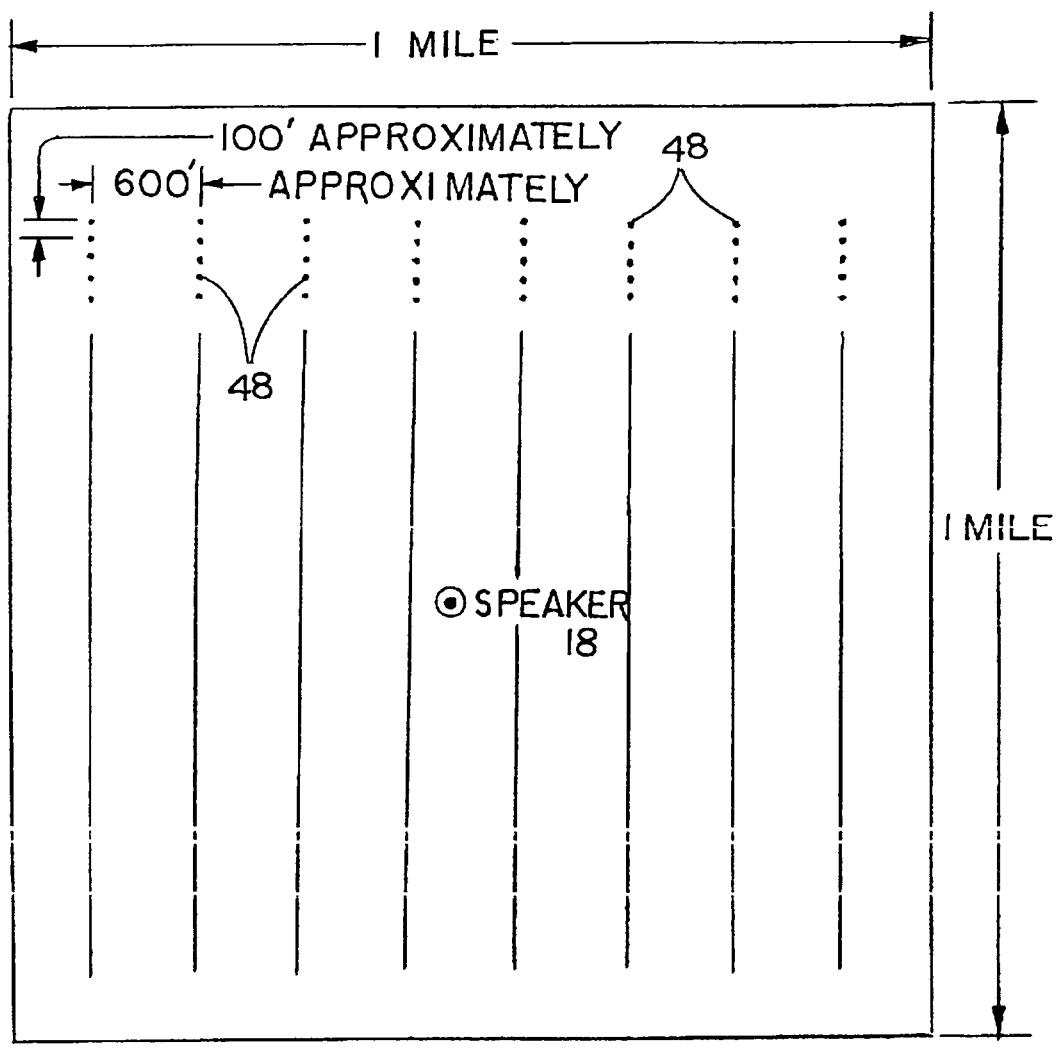
FIG. 4 is a graphical illustration of a sensor layout grid using the land based method of oil exploration shown in FIG. 3.

FIG. 3 illustrates another embodiment of a land based oil exploration system 40 which may be used to carry out the method of oil exploration of the present invention. Oil exploration system 40 is similar in many respects to oil exploration system 10 shown in FIG. 1. A vehicle in the form of a truck 42 includes an antenna 44 which uploads encrypted, position marked data to satellite 14 for relaying to antenna 32 at remote analyzing station 16. Antenna 44 also receives GPS data signals from GPS satellites 46 to determine a location of vehicle 42, and thus sparker 18. Truck 42 includes a second antenna 46 which communicates in a wireless manner with one or more sensors 48 (FIG. 4) positioned in a predetermined array relative to sparker 18. A large number of sensors might be positioned in a relatively large array of sensors as shown in FIG. 4, or a smaller array of sensors may be placed relative to sparker 18 and moved to different locations, with the sound waves being generated again at the new central locations.

Geologic exploration based upon an IEK principal as described above may also be used in conjunction with other geologic exploration techniques. These other exploration techniques include:

1. Identification of Serpentinized Peridotitic Bodies

These are typically marked by gravity-low and magnetic-high patterns. Deeper non-serpentinized peridotie bodies are marked by gravity-high and magnetic-low patterns. The serpentinized bodies are often diaperitic and rise in response to reactivation of basement structures and buoyancy. They are the source for the hydrothermal fluids and are spatially related and structurally connected to economic hydrocarbon accumulations.

2. Delineation of Basement Structural Zones (High-Production Fairways)

The high-production fairways are structural-stratatigraphic zones rooted in basement faults that have been active over geologic times as growth faults and fluid conduits. Locally they contain sweet-spot fracture chimneys and fractured reservoirs. In the Western US once these are identified they can be kinematically modeled to predict hydrocarbon fluid migration and trapping. Identification of the structures forming the fairways is done through an integrated approach using: digital elevation data, satellite imagery, low-altitude stereo-paired photos, gravity maps, magnetic maps, and thermal infrared images.

3. Geokinematic Analysis of Basement Faults (Predict Fluid Flow and Trapping)

Through integration of the above structural data in light of knowledge of the structural kinematics a hydrocarbon fluid flow model is constructed. This will identify specific structurally-favorable areas for follow-up.

4. Chemically Typing Black Shale (Economic Potential and Vectoring Parameters)

Before vectoring to specific targets, chemical analysis of the black shale or known hydrocarbon systems is done to "type" the hydrocarbon system. This not only predicts ultimate economic potential but it provides a chemical template for vectoring (i.e., it identifies the elements and compounds that will be useful in tracking fluid flow and identification of a target and how they fractionate into assemblages).

5. Identification and Calibration of Bright Spots and Thermal Anomalies

Alteration and bright spots seen on satellite imagery and specific types of thermal anomalies seen on infrared images or pictures are used to filter the areas identified by geokinematic analysis. Calibration of satellite and thermal infrared imagery to known oil and gas fields is done to tune the imagery to the target. Later soil gas anomalies are used to further refine this calibration to delineate geochemical assemblages.

6. Geochemical Vectoring of Black Shale Exhalite

Soil gas profiles are conducted to determine where bright spots, favorable thermal patterns, and fracture chimneys indicate a potential target. The targets that match the calibrated chemical signature (fingerprint) are then candidates for a soil gas grid which is designed for the nature of the target. The soil gas geochemistry from the grid is then mathematically/statistically reduced using vectoring software and it is used to construct geochemical assemblages. "Assemblages" are groups of elements and compounds that form components of the whole hydrocarbon system. They reflect decreasing pressure and temperatures and especially chemical fraction due to increasing oxidation state away from the source. They also delineate the fluid flow path and reservoir.

7. Lithogeochemistry and Mapping of Black Shanke Exhalite Chemical Facies

If a stratigraphic timeline can be identified in the black shale and if samples (outcrops and/or drill holes) are available over a significant geographic area a lithogeochemical study can be done. By sampling on a timeline in the black shale the geochemical dispersion and facies changes away from the hydrothermal vent can be mapped. They will vector to the hydrothermal fluid feeder vent structure which is commonly a growth fault intersection with a transcurrent or secondary fault coincident with a high-production fairway.

8. Geologic Integration and Target Definition

Integrating the vectoring results with geokinematic analysis and all geologic data models the system in 4-D (space and time) and will identify drill target(s).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of geologic exploration for subsurface deposits, comprising the steps of:
    emitting energy below a surface of the earth;
    sensing a plurality of reactive electro-magnetic waves resulting from said emitted energy;
    outputting signals from a plurality of sensors to a vehicle corresponding to said sensed reactive electro-magnetic waves;
    determining position data for said plurality of sensors;
    generating position marked data corresponding to said outputted signals and said position data;
    uploading said position marked data from said vehicle to a satellite; and
    relaying said position marked data from said satellite to a remote analyzing station.

2. The method of geologic exploration of claim 1, wherein said transmitting step comprises transmitting wireless signals to said vehicle.

3. The method of geologic exploration of claim 1, wherein said transmitting step comprises transmitting said position marked data via at least one electrical conductor to said vehicle.

4. The method of geologic exploration of claim 1, wherein said step of emitting energy comprises emitting sound waves from a sparker.

5. The method of geologic exploration of claim 4, wherein said sound waves are emitted at a frequency of less than approximately 50 hertz.

6. The method of geologic exploration of claim 4, wherein said sparker is powered using a direct current electrical power supply.

7. The method of geologic exploration of claim 1, wherein said uploading step includes encrypting said position marked data.

8. The method of geologic exploration of claim 1, wherein said remote analyzing station carries out at least one of:
    data analysis of said position marked data to determine subsurface deposits;
    graphical illustration of said position marked data; and
    invoicing.

9. The method of geologic exploration of claim 1, wherein said step of determining position data comprises determining GPS data.

10. The method of geologic exploration of claim 1, wherein said surface comprises one of land and water.

11. The method of geologic exploration of claim 1, wherein said subsurface deposits comprise at least one of oil, gas, one or more metals, and one or more minerals.

12. The method of geologic exploration of claim 1, wherein said emitting and sensing steps define an induced electro-kinetic effect.

13. A method of geologic exploration for subsurface deposits, comprising the steps of:
    emitting energy below a surface of the earth;
    sensing a plurality of reactive electro-magnetic waves resulting from said emitted energy using a plurality of sensors;
    outputting signals from said plurality of sensors to a vehicle corresponding to said sensed reactive electro-magnetic waves;
    determining position data for said plurality of sensors;
    generating position marked data corresponding to said outputted signals and said position data;
    encrypting said position marked data;
    uploading said encrypted position marked data from said vehicle to a satellite; and
    downloading said encrypted position marked data from said satellite to a remote analyzing station.

14. The method of geologic exploration of claim 13, wherein said outputting step comprises transmitting wireless signals to said vehicle.

15. The method of geologic exploration of claim 13, wherein said outputting step comprises transmitting said position marked data via at least one electrical conductor to said vehicle.

16. The method of geologic exploration of claim 13, wherein said step of emitting energy comprises emitting sound waves from a sparker.

17. The method of geologic exploration of claim 16, wherein said sparker is powered using a direct current electrical power supply.

18. The method of geologic exploration of claim 13, wherein said remote analyzing station carries out at least one of:

data analysis of said position marked data to determine subsurface deposits;

graphical illustration of said position marked data; and invoicing.

19. The method of geologic exploration of claim 13, wherein said step of determining position data comprises determining a single position datum for each of said plurality of sensors.

20. The method of geologic exploration of claim 13, wherein said step of determining position data comprises determining GPS data for each of said plurality of sensors.

21. The method of geologic exploration of claim 13, wherein said surface comprises one of land and water.

22. The method of geologic exploration of claim 13, wherein said subsurface deposits comprise at least one of oil, gas, one or more metals, and one or more minerals.

* * * * *